(12) United States Patent
Erban et al.

(10) Patent No.: US 8,833,867 B2
(45) Date of Patent: Sep. 16, 2014

(54) METHOD AND DEVICE FOR THE CONTROL OF A BRAKE SYSTEM

(75) Inventors: Andreas Erban, Löchgau (DE);
Thomas Rader, Reutlingen (DE);
Alexander Haeussler, Heidelberg (DE);
Manfred Gerdes, Oberriexingen (DE);
Ralf Gutmann, Jagsthausen (DE);
Thomas Glasstetter, Oberderdingen (DE)

(73) Assignee: Robert Bosch GmbH, Stuttgart (DE)

(*) Notice: Subject to any disclaimer, the term of this patent is extended or adjusted under 35 U.S.C. 154(b) by 3079 days.

(21) Appl. No.: 10/232,046

(22) Filed: Aug. 29, 2002

(65) Prior Publication Data
US 2003/0141759 A1 Jul. 31, 2003

Related U.S. Application Data

(63) Continuation of application No. 09/980,870, filed as application No. PCT/DE01/00395 on Feb. 2, 2001, now abandoned.

(30) Foreign Application Priority Data

Mar. 8, 2000 (DE) .................. 100 11 269

(51) Int. Cl.
*B60T 8/172* (2006.01)
*B60T 8/1761* (2006.01)
(52) U.S. Cl.
CPC ............. *B60T 8/172* (2013.01); *B60T 2201/02* (2013.01); *B60T 8/17616* (2013.01)

USPC ............................................. 303/20
(58) Field of Classification Search
USPC ................. 303/3, 20, 134–148, 9.62
See application file for complete search history.

(56) References Cited

U.S. PATENT DOCUMENTS

| | | | |
|---|---|---|---|
| 4,712,839 A * | 12/1987 | Brearley et al. .................... 303/3 |
| 5,229,944 A | 7/1993 | Yasuno | |
| 5,407,258 A * | 4/1995 | Giers et al. .................... 303/147 |
| 5,443,307 A * | 8/1995 | Maier .......................... 303/169 |
| 5,454,629 A * | 10/1995 | Johnson ....................... 303/156 |
| 5,577,812 A | 11/1996 | Soejima | |
| 5,646,848 A * | 7/1997 | Walenty et al. ................. 701/70 |
| 5,762,407 A * | 6/1998 | Stacey et al. .................. 303/155 |
| 5,944,394 A * | 8/1999 | Friederichs et al. ......... 303/148 |
| 6,044,319 A * | 3/2000 | Rosendahl et al. ........... 303/146 |
| 6,082,835 A | 7/2000 | Brearley | |
| 6,208,926 B1 * | 3/2001 | Wagner et al. .................... 303/3 |
| 6,564,135 B2 * | 5/2003 | Grob et al. ...................... 701/70 |

FOREIGN PATENT DOCUMENTS

| | | |
|---|---|---|
| DE | 41 14 734 | 11/1992 |
| DE | 196 16 732 | 10/1997 |
| JP | 46-16350 | 11/1972 |
| JP | 6-247276 | 9/1994 |
| JP | 11-503387 | 3/1999 |
| JP | 11-314535 | 11/1999 |

* cited by examiner

*Primary Examiner* — Robert A Siconolfi
(74) *Attorney, Agent, or Firm* — Kenyon & Kenyon LLP

(57) ABSTRACT

In a method and a device for the control of a vehicle brake system, the setpoint values for each wheel are corrected based on the difference between brake pressures in at least one wheel brake of two different brake circuits.

10 Claims, 3 Drawing Sheets

METHOD AND DEVICE FOR THE CONTROL OF A BRAKE SYSTEM

CROSS-REFERENCE TO RELATED APPLICATIONS

This application is a continuation of U.S. patent application Ser. No. 09/980,870, which is a national stage application of International Application No. PCT/DE01/00395, filed Feb. 2, 2001, which claims priority to German Application No. 100 11 269.2, filed Mar. 8, 2000, the contents of all of which are hereby incorporated by reference in their entireties.

FIELD OF THE INVENTION

The present invention relates to a method and a device for the control of a brake system.

BACKGROUND INFORMATION

German Published Patent Application No. 196 16 732 describes a control system for a brake system as a function of a value predefined by the driver and/or a corresponding predefined value of a regulating system, e.g., an adaptive cruise control system (ACC), a setpoint value for the control of the brake system, preferably a braking torque setpoint value distributed among the individual brake circuits or wheel brakes, is predefined. This setpoint value is generated by a deceleration regulator which brings the vehicle deceleration in line with a deceleration setpoint value predefined by the driver and/or the at least one other regulating system. The braking torque setpoint values distributed among the individual brake circuits or wheel brakes are then set via braking torque regulators. In distributing the setpoint braking torque among the individual brake circuits or wheel brakes, it is assumed that the brake pressures set at the wheel brakes, or some other control variable used in the individual brake circuits or wheel brakes, are equal (on condition that the setpoint values are equal).

The publication SAE Paper 950759, "VDC: The Vehicle Dynamics Control System of Bosch," by Anton van Zanten, Rainer Erhardt and Georg Pfaff, describes a control system for a brake system in which a setpoint braking torque value is converted into a setpoint brake pressure for a wheel brake via a hydraulics model and into trigger signals for the control of the valve arrangement assigned to the wheel brake. This ensures that the desired braking torque and the desired brake pressure are set at each wheel brake. The hydraulics model is also used to determine the brake pressure in the wheel brake and the braking force exerted, or the braking torque, as a function of the trigger signals for the valve arrangement

SUMMARY

The method according to the present invention provides that differences in the individual brake circuits and wheel brakes, respectively, are taken into account when the setpoint value, (e.g., the braking torque) is distributed among the individual brake circuits or wheel brakes, and tolerances are taken into account and effectively compensated for when conversion into trigger signals for the brake application devices is performed.

The brake pressure level at the individual brake circuits or wheel brakes may be rendered uniform. As a result, the wheel brakes undergo uniform wear and tear, and undesirable yaw moments during the braking procedure are avoided.

Moreover, manufacturing-related tolerances in the brake system components that result in differing brake pressure levels at the wheel brakes or brake circuits, are compensated for. Further variables that have a corresponding influence, e.g., gradient resistances, changes in the vehicle mass, additional components attached to the vehicle, or use of a trailer, have no impact on the quality of the estimates, because a difference is calculated.

Furthermore, the braking procedure is made more comfortable, because even distribution is guaranteed, wear and tear on the brakes is uniform, and no yaw moments arise.

When the brake control undergoes correction, there may be no need to refer back to the hydraulics model via which the setpoint value is converted into trigger variables and via which an actual value is calculated as a function of the trigger variables, so that deviations as a result of, for example, manufacturing tolerances, which arise when this model is used, are also corrected.

DETAILED DESCRIPTION

Figure 1:
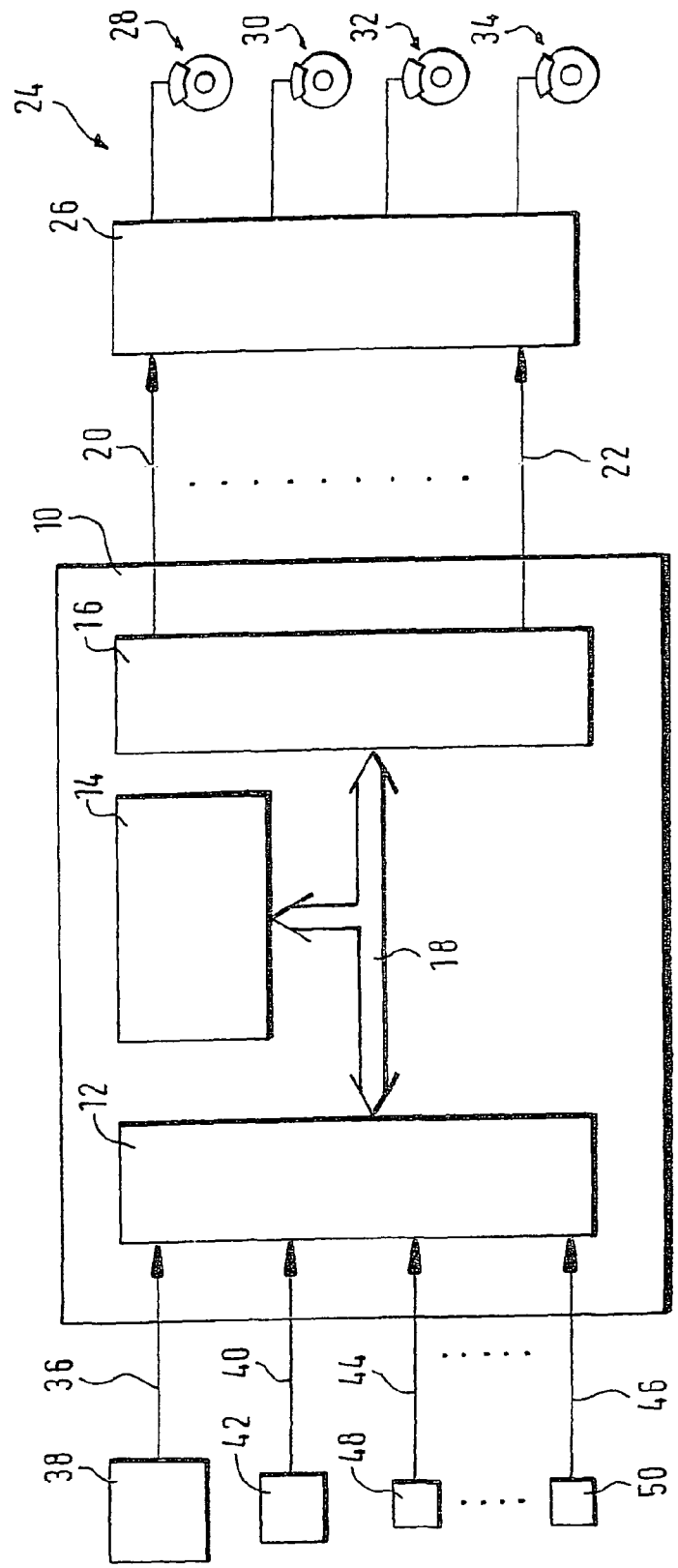
FIG. 1 is an overview block diagram of a control device for the control of a vehicle's brake system.

FIG. 1 illustrates an electronic control unit (10) having an input circuit (12), at least one microcomputer (14), and an output circuit (16). These are connected to one another via a communication system (18), so that data and information may be exchanged among them. The electronic control unit controls the brake system (24) of a vehicle via output lines (20-22). In the example embodiment illustrated, this constitutes a hydraulic brake system having pump and valve arrangements (26) which, based on the signals sent via lines (20-22), controls the braking force at individual wheel brakes (28, 30, 32, and 34). Brake systems of this kind are conventional. Furthermore, input lines, which in the example embodiment are combined to form a bus system, (e.g., a CAN), are connected to electronic control unit (10). A first input line (36) connects a vehicle-speed regulating device (38) to control unit (10). Another input line (40) connects a brake pedal (42) to control unit (10). A variable that represents the setpoint deceleration, or a variable from which a setpoint deceleration may be deduced, is sent from vehicle-speed regulating device (38). A value that represents the degree of actuation of the brake pedal (path, force, pressure, etc.) is sent from brake pedal (42) via input line (40). Furthermore, input lines (44-46) are provided which start from measuring devices (48-50), and which convey further operating variables for the brake system, the vehicle, or its drive unit, e.g., wheel speeds, engine speed, brake force that has been applied (brake pressure), etc.

The control functions to be performed for controlling the brake system are implemented as programs in microcomputer (14). In an example embodiment, control unit (10) controls not only conventional functions, such as an anti-lock brake system (ABS), a traction control system (ASR), or the vehicle dynamics control system mentioned above, but also the brake force at the wheel brakes, as a function of the driver's intent or at least one other regulating system, e.g., a vehicle-speed regulator. A setpoint deceleration value for the vehicle is determined from the degree of actuation of the brake pedal, based on calculations, characteristic curves and characteristic maps. This setpoint value is compared with the deceleration actual value and sent to a regulator which, according to the predefined regulating strategy, generates an output signal which represents a braking torque to be set at the wheel brakes and the level of which ensures that the actual deceleration is brought in line with the setpoint deceleration. In the example embodiment, the braking torque value determined by the regulator is set at each wheel brake as part of braking torque regulation, via corresponding control of valve and pump arrangements (26). The vehicle-speed regulator, in particular a vehicle-speed regulator that works in conjunction with a distance warning radar system, predefines a braking intervention to reduce the speed and to maintain the setpoint speed or a minimum distance. To accomplish this, the vehicle-speed regulator sends control unit (10) a setpoint deceleration signal, or variables from which a signal of this kind may be deduced, which is applied as part of the regulating via actuation of the wheel brakes described above. In this context, vehicle-speed regulator (38) may also be a component of control unit (10) and may be and implemented as programs in microcomputer (14).

In the example embodiment, a hydraulically controlled brake system is used as the brake system. However, the scope of the present invention is not limited to this application, but rather may also be used as described above with pneumatic brake systems or wheel brakes actuated by electromotive arrangements, in the latter case other control variables (such as current) are involved rather than brake pressures.

As mentioned above, in the case of computer-controlled braking interventions by the at least one other regulating system, or in the case of braking interventions that depend on values predefined by the driver, it is assumed that, given that the setpoint values in the brake circuits are uniform, the brake pressures will be uniform up to a specific pressure level. The actual brake pressures in the wheel brakes are calculated using the hydraulics model, with the help of the trigger variables of the valve arrangements. However, due to manufacturing-related tolerances in the hydraulic equipment, errors in the pressure estimates calculated by the hydraulics model arise. These pressure estimates are nonetheless used as the basis for setting the pressure. If the hydraulic components behave in a deviating manner, the actual pressure present at the wheel in question will deviate from that which was calculated. As a result, due to the differing pressures, undesirable effects will arise and impact vehicle behavior: In particular, one individual braking circuit will be over-braked. Because a larger percentage of the braking intervention is performed via this circuit, over time this will lead to increased wear and tear on the brakes, and in brake circuits that are distributed diagonally it may even result in an undesirable yaw moment build-up. Therefore, sensor systems already present, or variables deduced from them, as described, for example, above, are used to calculate the pressure difference between the individual brake circuits or individual wheel brakes. A differential-pressure closed control loop is then superimposed on the brake adjustment and adjusts the differential pressure to a predefined value, in particular 0, by correcting the distribution of the setpoint moment among the individual brake circuits. As a result, undesirable effects, such as over-braking of individual circuits or yaw moment build-up, are avoided.

Because the pressure difference between the brake circuits or individual wheel brakes is calculated, possible sources of error, e.g., gradient resistances, changes in the vehicle mass, additional components attached to the vehicle or use of a trailer, are eliminated. If differential pressures arise, when braking intervention is performed, measures are taken to counteract the aforementioned adverse influences by correcting the braking distribution.

The estimation of the pressure difference between the individual brake circuits or wheel brakes is based on the sensor system that is available, e.g., as part of the vehicle dynamics control system mentioned above. In that context, the brake pressure in the individual brake circuits or wheel brakes is calculated independently of the hydraulics model that may be used.

In so doing, the engine torque MKAHALB exerted at the driven wheel, wheel speeds VRADXY, wheel contact forces FNXY, and vehicle-specific parameters, such as axle geometries, tire characteristic values and brake characteristic values, are used as variables. In the range of small and medium-sized decelerations, the dynamics of the braking procedure may be ignored in estimates and reduced to an additive estimate.

In the case of a driven wheel, the actual brake pressure is calculated using the following equation:

$$PRAD=CLAM/CP(\lambda*FN*RRAD+MKAHALB/CLAM)$$

Parameter CLAM represents the tire longitudinal rigidity, CP represents the conversion of the brake pressure into the braking force (brake characteristic value), and wheel radius RRAD are constants. The wheel radius and the brake characteristic value may also be adapted. $\lambda$ represents the wheel slip of the wheel, which may be determined from the wheel speed and vehicle speed as the relative difference between the wheel speed and the vehicle speed, in a conventional manner. FN is the wheel contact force, which is either measured or estimated from other variables. MKAHALB is the torque conveyed to the driven wheel. This is determined from the engine torque produced by the vehicle's drive unit, the gear ratio and the efficiency of the drive train being taken into account, half of the torque thus produced representing the torque conveyed to the individual driven wheel. In the case of a non-driven wheel, the additive term in the above equation is not used and is not replaced.

The brake pressure at one wheel of the first brake circuit and at one wheel of the second brake circuit is determined in the manner described (in the case of diagonal distribution, this may be performed for wheels on the same axle and in the case of other brake circuit distributions, the axle-based distribution is taken into account), and the difference between the two brake pressures that have been determined is calculated. This calculation yields a pressure difference between the brake circuits, as a function of which the distribution of the setpoint torque among the individual circuits is corrected. The differential pressure that is calculated constitutes the input variable for a subordinate differential pressure regulator which reduces the difference between the brake pressures in the individual circuits, e.g., to zero, by correcting the distribution of the setpoint torque among the individual circuits or axles as necessary.

Depending on the type of application, calculation of the actual brake pressures is performed either only at selected wheel brakes or at all wheel brakes, in the latter instance the greatest difference between the brake circuits (axle-based distribution being taken into account) being used as the basis for the regulating. Furthermore, according to one example embodiment, the pressure differences between the individual wheel brakes are calculated, and distribution of the setpoint torques among the individual wheel brakes is corrected as necessary by the differential pressure regulator, so that the difference relative to the other wheel brake or wheel brakes assumes a defined value (axle-based distribution being taken into account), e.g., 0.

In the example embodiment described above, the manner in which the differential pressure is determined based on each brake pressure values is described. In other example embodiments, calculation of the difference may be performed in a similar manner based on brake force values or braking torque values, in such instances the subordinate closed control loop being a differential brake force regulator or differential braking torque regulator.

Figure 2:
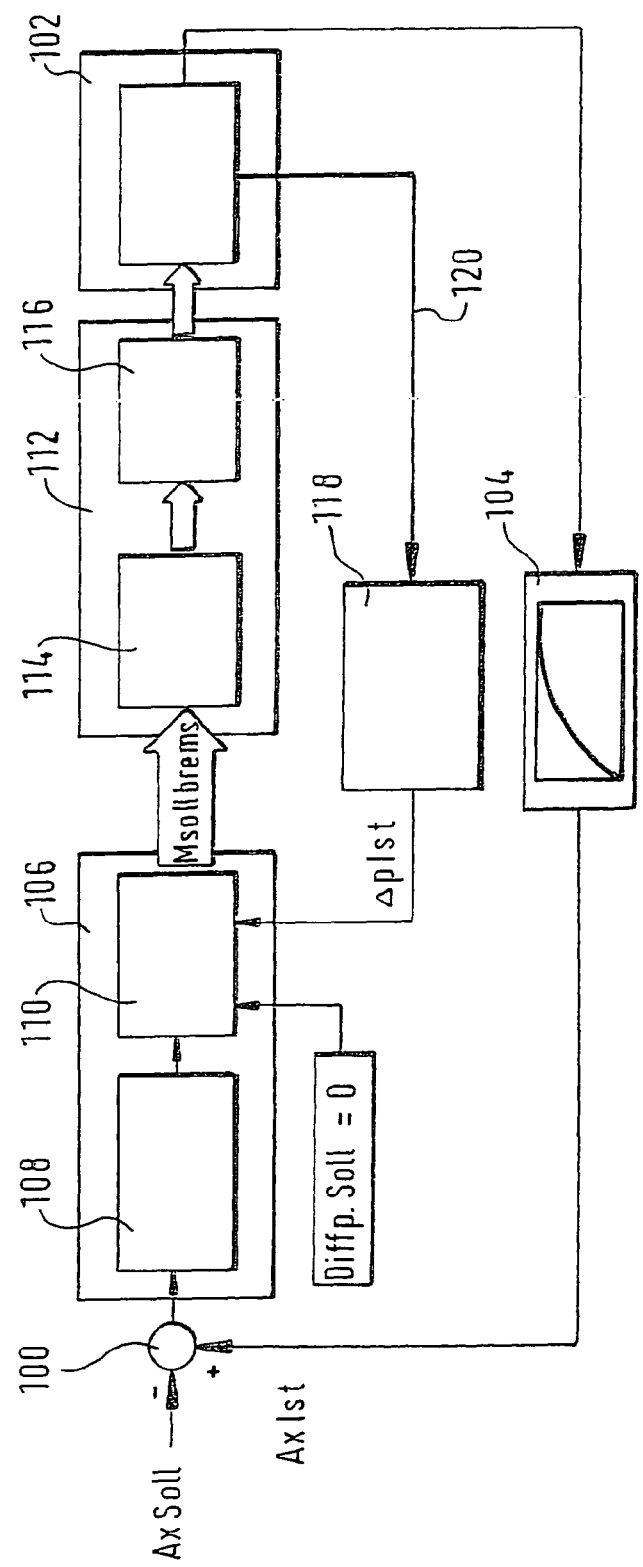
FIG. 2 is a function diagram of an example embodiment of the control system.

FIG. 2 is a function diagram illustrating brake intervention implemented as part of a deceleration regulating system having a subordinate differential pressure closed control loop. The blocks represent the individual programs or program steps, and the connecting lines represent the flow of information.

A setpoint value for the vehicle's longitudinal deceleration AXSOLL is sent to the regulating system illustrated in FIG. 2, either from at least one external regulating system, e.g., an adaptive cruise control system, and/or is deduced from the degree to which the driver has actuated the brake pedal. At a comparison point 100, this setpoint value is compared with a variable that corresponds to the vehicle's actual deceleration (AXIST). In the example embodiment, the vehicle's actual longitudinal deceleration, which is illustrated symbolically as block 102, is determined from wheel speed signals, e.g., from the time derivative of at least one wheel speed. The vehicle's longitudinal deceleration determined in this manner is filtered using a filter 104, e.g., a lowpass filter, and sent to comparison point 100.

The difference between the setpoint deceleration and the actual deceleration is sent to regulating system 106. First a setpoint braking torque value is determined by deceleration regulator 108 itself as a function of the difference between the deceleration values and in accordance with a predefined regulating strategy, e.g., as described above. This setpoint braking torque value is distributed among the individual wheel brakes in accordance with a predefined key, e.g., based on a suitable distribution among the front and rear axle brakes so as to ensure vehicle stability. For example 60% of the total setpoint braking torque may be distributed among the front axle brakes and 40% among the rear axle brakes, within a given vehicle axle it being distributed in equal parts among the individual wheel brakes of the left and right wheels. The result of this braking torque distribution is setpoint braking torques MSOLLXY for each of the vehicle's wheel brakes. Distribution of the braking torque among the individual wheel brakes is performed in distributor 110, in which the aforementioned differential pressure regulator is also arranged. Differential pressure setpoint value DIFFPSOLL, which may be, e.g., 0, is sent to distributor 110 along with an actual value DPIST, which indicates the pressure difference between selected wheel brakes, in particular, of the two braking circuits. The differential pressure regulator may include a comparison step in which a check is performed to determine whether the difference between the differential pressure setpoint value and its actual value is greater than, equal to, or less than 0. As a function of the results of the comparison, the key on which the braking torque distribution is based is increased or lowered by a given value so that the actual differential pressure is brought in line with the setpoint value. In another example embodiment, the differential pressure regulator makes available a regulator which generates an output signal in accordance with a predefined regulating strategy and as a function of the difference between the setpoint differential pressure and the actual differential pressure. The magnitude of this output signal then constitutes a value for the correction factor, via which the factor for distribution of the braking torques is corrected. The braking torque values MSOLLXY for each individual wheel determined in this way are then sent to the final control elements combined in block 112. For each wheel brake, the individual setpoint braking torque values are converted into setpoint brake pressures via a hydraulics model 114 as described above, taking into account, for example, the brake characteristic value, and are compared with actual brake pressures determined with the help of the hydraulics model, and, based on the difference, trigger signals are generated via which valve arrangements 116 assigned to each wheel brake are triggered. In so doing, the actual brake pressures of the individual wheel brakes are brought in line with the predefined setpoint brake pressures.

The actual value of the differential pressure is determined in differential pressure model 118 as a function of the aforementioned vehicle variables (line 120) and in accordance with the formula set forth above, the values for at least one wheel of two different brake circuits being compared with one another.

Figure 3:
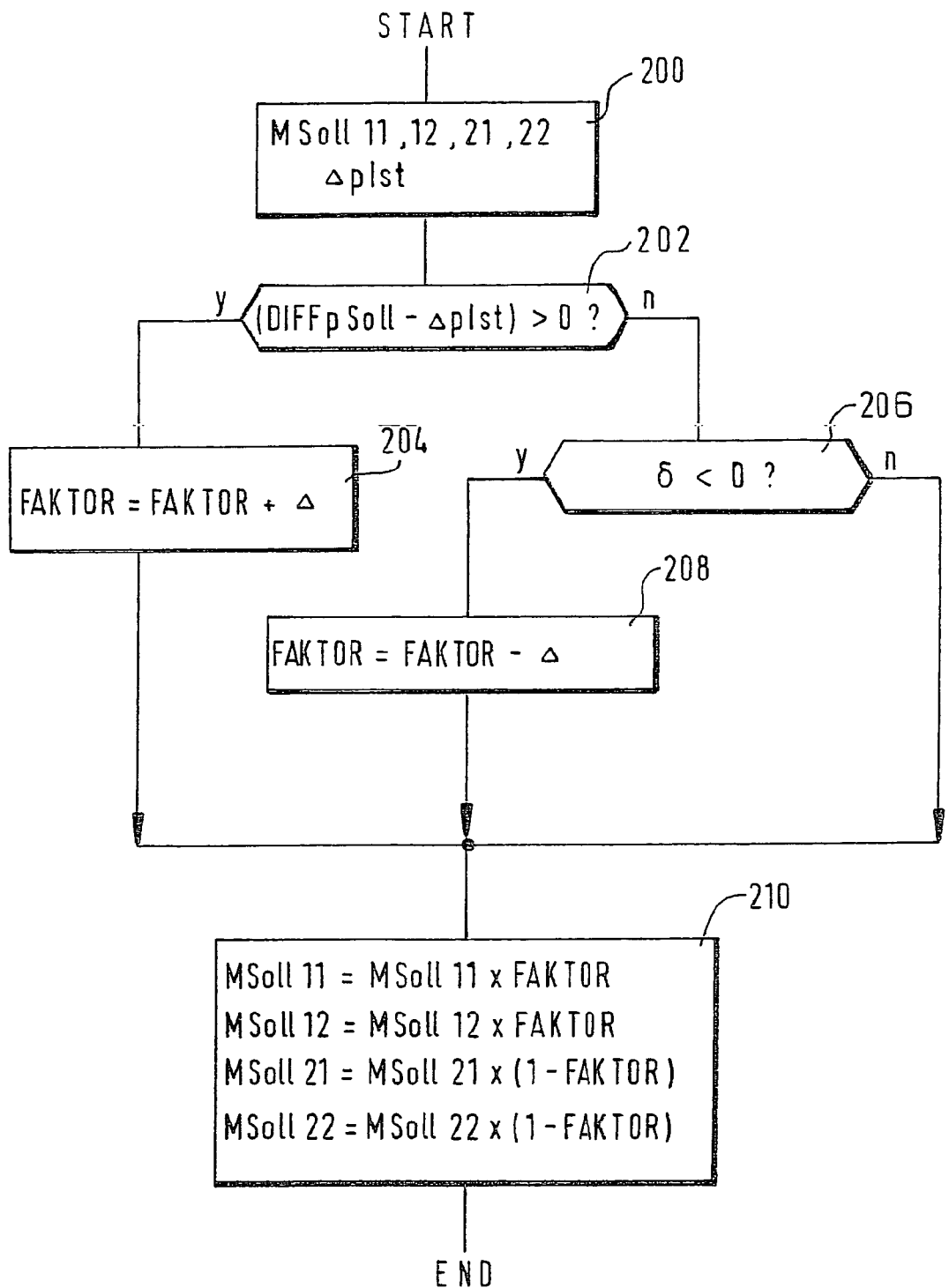
FIG. 3 illustrates an example embodiment of the distribution of setpoint braking torques among the brake circuits with a flow chart.

In the example embodiment, the differential pressure regulating is a computer program of a microcomputer of the control unit for the control of the brake system. FIG. 3 is a flow-chart which illustrates an example embodiment of a computer program of this kind.

The program illustrated in FIG. 3 is executed at predefined time intervals. In first step 200, the individual setpoint torques MSOLL11, 12, 21, 22 are variables, the first digit representing the number of the brake circuit, and the second digit representing the number of the wheel brake in that brake circuit. Axle-based distribution, if present, is already taken into account in these values. In step 200, the actual value of the differential pressure, $\Delta$PIST, which has been calculated in accordance with the model described above, is read in. In subsequent step 202, difference $\delta$ between the setpoint value of the differential pressure, DIFFPSOLL, and the actual value, $\Delta$PIST, is checked as to whether or not it is greater than 0. If it is greater, in step 204 a factor is increased by a given value $\Delta$. If the setpoint/actual difference is not greater than 0, in step 206 a check is performed as to whether it is less than 0. If so, in step 208 the aforementioned factor is reduced by value $\Delta$. If step 206 has indicated that the setpoint/actual difference is not less than zero and furthermore is equal to zero, the factor is left unchanged. Following steps 204, 208 and 206, in the event of a 'No' response individual setpoint brake values are corrected in step 210 using the factor defined in step 204 or 208. The factor is a value between 0 and 1 that constitutes the difference between the brake pressure levels in the individual brake circuits. In the example embodiment illustrated in FIG. 3, setpoint braking torques for the wheel brakes of the first brake circuit, MSOLL11 and MSOLL12, are multiplied by the factor. The setpoint torques for the wheel brakes of the second brake circuit are multiplied by the variable 1-factor. In this manner, the setpoint braking torque values are corrected so that the setpoint differential pressure and the actual differential pressure are brought in line with one another. Following step 210, the program is ended and executed again after the subsequent time interval.

What is claimed is:
1. A method for controlling a brake system, comprising the steps of:
assigning an electrically controllable brake final control element to each wheel brake, the control element being actuatable as a function of a setpoint value predefined for each wheel;

determining an actual value representing a braking force acting at each wheel brake;

determining a deviation value between the actual values corresponding to at least two wheel brakes of two brake circuits; and correcting the setpoint values for the control of the wheel brakes as a function of the deviation.

2. The method according to claim 1, further comprising the step of determining a correction value based on a deviation value of the actual values from a predefined setpoint deviation value.

3. The method according to one of claim 1, wherein the deviation value is determined in the determining step based on vehicle variables.

4. The method according to claim 3, wherein the vehicle variables include wheel slip and wheel contact force.

5. The method according to claim 4, wherein the vehicle variables further include drive torque applied to the wheel.

6. The method according to claim 1, wherein the actual value includes a brake pressure.

7. The method according to claim 1, further comprising the steps of:

calculating the setpoint values for the wheel brakes based on a total setpoint value; and correcting a distribution of the total setpoint value among the wheels as a function of the deviation value.

8. The method according to claim 7, further comprising the step of determining the total setpoint value by a deceleration regulator that brings a speed of the vehicle in line with a predetermined setpoint value.

9. A method for controlling a brake system, comprising the steps of:

assigning an electrically controllable brake final control element to each wheel brake, the control element being actuatable as a function of a setpoint value predefined for each wheel;

determining an actual value representing a braking force acting at each wheel brake, wherein the actual value includes a brake pressure;

determining a deviation value between the actual values corresponding to at least two wheel brakes of two brake circuits; and correcting the setpoint values for the control of the wheel brakes as a function of the deviation;

wherein the brake pressure is determined as a function of vehicle variables in accordance with the equation:

$$PRAD = CLAM/CP(\lambda * FN * RRAD + MKAHALB/CLAM)$$

wherein an additive term is not used for a non-driven wheel.

10. A device for controlling a brake system, comprising:

a control unit configured to generate trigger signals for brake actuators assigned to each wheel brake;

trigger signal generators configured to determine the trigger signals based on predefined values for each wheel brake; and a regulator configured to correct the predefined values for each wheel brake as a function of the difference between the actual values of at least two wheel brakes of at least two brake circuits, a variable representing a braking force at the wheel brake determined as the actual value.

* * * * *